(12) United States Patent
Kim et al.

(10) Patent No.: US 9,103,402 B2
(45) Date of Patent: Aug. 11, 2015

(54) SHOCK ABSORBER

(71) Applicant: MANDO CORPORATION, Pyeongtaek-si, Gyeonggi-do (KR)

(72) Inventors: Hark Joo Kim, Seoul (KR); Tae Ju Kim, Yongin-si (KR); Jun Hyuk Lim, Seongnam-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 64 days.

(21) Appl. No.: 14/183,822

(22) Filed: Feb. 19, 2014

(65) Prior Publication Data
US 2014/0231199 A1 Aug. 21, 2014

(30) Foreign Application Priority Data

Feb. 21, 2013 (KR) .................. 10-2013-0018473
Feb. 21, 2013 (KR) .................. 10-2013-0018475

(51) Int. Cl.
*F16F 9/512* (2006.01)
*F16F 9/18* (2006.01)
*F16F 9/34* (2006.01)

(52) U.S. Cl.
CPC . *F16F 9/512* (2013.01); *F16F 9/18* (2013.01); *F16F 9/34* (2013.01)

(58) Field of Classification Search
CPC ........... F16F 9/5126; F16F 9/512; F16F 9/18; F16F 9/34; F16F 9/348; F16F 9/3482
USPC ................. 188/313, 316, 322.22, 282.5, 280, 188/322.13
See application file for complete search history.

(56) References Cited

U.S. PATENT DOCUMENTS

| | | | |
|---|---|---|---|
| 8,167,101 B2* | 5/2012 | Chikamatsu | 188/313 |
| 2005/0263363 A1* | 12/2005 | Katou et al. | 188/322.22 |
| 2011/0214955 A1* | 9/2011 | Maeda et al. | 188/322.13 |
| 2011/0226572 A1* | 9/2011 | Heyn et al. | 188/284 |

* cited by examiner

*Primary Examiner* — Melanie Torres Williams
(74) *Attorney, Agent, or Firm* — Lowe Hauptman & Ham, LLP (57) ABSTRACT

A shock absorber is provided. A first piston, a pilot valve, a second piston, and a rebound retainer are sequentially connected to a piston rod reciprocating within a cylinder. An upper portion of the second piston is provided inside the first piston. Due to a first compression chamber formed in the first piston, a second compression chamber formed in the second piston, a third compression chamber formed between the first piston and the second piston, and a fourth compression chamber formed in the rebound retainer, it is possible to improve a ride comfort by reducing a damping force over periods from an ultra-low-speed period to a high-speed period and it is possible to achieve the compact configuration and the cost reduction by reducing the overall length of the processing portion.

8 Claims, 8 Drawing Sheets

FIG. 8

SHOCK ABSORBER

CROSS-REFERENCE(S) TO RELATED APPLICATION

This application claims priority of Korean Patent Application No. 10-2013-0018473, filed on Feb. 21, 2013, and Korean Patent Application No. 10-2013-0018475, filed on Feb. 21, 2013, in the Korean Intellectual Property Office, the contents of which are incorporated herein by reference in its entirety.

BACKGROUND OF THE INVENTION

1. Field of the Invention

The present invention relates to a shock absorber, and more particularly, to a shock absorber that can improve a ride comfort by reducing a damping force over periods from an ultra-low-speed period to a high-speed period, and can achieve the compact configuration and the cost reduction by reducing the overall length of the processing portion.

2. Description of the Related Art

Generally, a shock absorber is designed to support a weight of a vehicle body and suppress and dampen a vibration transferred from a road surface to the vehicle body, contributing to improving a ride comfort and protecting loaded goods and various parts of a vehicle.

Such a shock absorber includes a cylinder filled with a working fluid (oil), a reciprocating piston rod connected to a vehicle body, and a piston valve connected to a lower end of the piston rod to slide within the cylinder and control a flow of the working fluid.

The existing shock absorber forms one passage within the cylinder by the piston valve. However, this structure has difficulty in increasing a cross-sectional area of the passage and has a limitation in reducing a damping force in a high-speed period.

In addition, in the existing shock absorber, a rapid variation in the damping force occurs at a blow-off point, causing a degradation in ride comfort.

There is known a shock absorber employing a piston valve forming two passages in order to overcome the limitation of the structure where one passage is formed.

However, in the case of the shock absorber provided with the piston valve forming two passages, since a plurality of parts are stacked in the piston valve, the length of processing portions is increased, resulting in an increase in the total height of the apparatus.

In the case of the shock absorber provided with the piston valve forming two passages, a tuning factor is deficient in an ultra-low-speed period, and therefore, there is no margin for tuning.

In addition, the shock absorber provided with the piston valve forming two passages cannot indefinitely increase the diameter of holes forming a compression and rebound passage of the piston valve. Thus, there is a limitation in implementing a degressive characteristic at a high-speed period.

In particular, a shock absorber including a piston valve having a pilot valve mounted with a rubber sealing has a problem in that a ride comfort is degraded by a damping force leg phenomenon that the pilot valve is not closed due to a tension of the rubber sealing during a compression stroke.

CITATION LIST

Patent Literature

Korean Patent Application No. 10-2007-0049256
Korean Patent Application No. 10-2007-0067515
Japanese Patent Application Laid-Open No. 2010-38348

SUMMARY OF THE INVENTION

The present invention has been made in an effort to solve the above problems and is directed to provide a shock absorber that can improve a ride comfort by reducing a damping force over periods from an ultra-low-speed period to a high-speed period, and can achieve the compact configuration and the cost reduction by reducing the overall length of processing portions.

According to the present invention, a shock absorber includes: a first piston including a first compression chamber that is connected to an end of the piston rod reciprocating within a cylinder and is formed by a plurality of rebound passages penetrating in a vertical direction, the first piston having an opened lower portion to form an inner space recessed upward; a pilot valve connected to the piston rod and disposed in the inner space to selectively open a lower end of the rebound passage; a second piston forming a second compression chamber that is connected to the piston rod, has an upper portion accommodated in the inner space, and is disposed under the first piston, wherein connection rebound passages respectively connected to the rebound passages penetrate the second compression chamber in a vertical direction, and the second compression chamber has an opened upper portion to communicate with the inner space; a rebound retainer including a fourth compression chamber that is connected to the piston rod, is disposed under the second piston, and is formed by extension rebound passages respectively connected to the connection rebound passages; a disk valve assembly connected to the piston rod, disposed under the rebound retainer, and opening and closing a passage while allowing a deformation through communication with the extension rebound passages; and a third compression chamber formed by a space between an inner peripheral surface of the first piston forming the inner space and an outer peripheral surface of the second piston, together with a plurality of compression passages penetrating in a vertical direction of the first piston.

The shock absorber may further include a guide member connected along an edge of the pilot valve to cover an upper peripheral portion of the second piston and move upward and downward while interlocking with the pilot valve.

The guide member may include: a ring-shaped fixing piece connected along the edge of the pilot valve; and a cover piece extending from an edge of the fixing piece and facing an upper peripheral surface of the second piston, wherein a top surface of the fixing piece opens and closes a lower edge of the rebound passage.

The shock absorber may further include: a ring coupling groove recessed along the outer peripheral surface of the second piston; and a ring-shaped sealing member mounted in the ring coupling groove and facing an inner surface of the guide member.

The shock absorber may form a working passage that mutually connects the first compression chamber, the second compression chamber, and the extension rebound passage in ultra-low-speed and low-speed periods, and a working fluid within the cylinder may generate a damping force while passing through the disk valve assembly via the working passage.

The disk valve assembly may include: a disk-S including slits communicating with the extension rebound passages along edges and tightly disposed in a lower portion of the rebound retainer; and a main disk provided with a plurality of unit disks stacked in a lower portion of the disk-S. The shock absorber may form a working passage that mutually connects the first compression chamber, the second compression chamber, and the extension rebound passage in middle-speed and high-speed periods. When a pressure of the first compression chamber is higher than a pressure of the second compression chamber, the pilot valve may be opened to form a bypass passage that is connected to the third compression chamber and the inside of the cylinder.

The shock absorber may further include: a stepped portion formed to be stepped in a size smaller than a diameter of the piston rod along an outer peripheral surface of the end of the piston rod; a washer connected to the stepped portion, disposed above the first piston, and communicating with the compression passages and the rebound passages; and an intake valve connected to the stepped portion, disposed under the washer and above the first piston, and opening and closing a passage communicating with the compression passage and the rebound passage while allowing a deformation through communication with the washer, wherein the first piston, the pilot valve, the second piston, the rebound retainer, and the disk valve assembly are sequentially connected along a vertical direction of the stepped portion.

The shock absorber may further include: a washer connected to an end of the piston rod, disposed above the first piston, and communicating with the compression passages and the rebound passages; an intake valve connected to the piston rod, disposed under the washer and above the first piston, and opening and closing a passage communicating with the compression passage and the rebound passage while allowing a deformation through communication with the washer; and a spacer connected to the piston rod, disposed between the washer and the intake valve, and separating the washer and the intake valve from each other while limiting a vertical length where the intake valve is deformed.

DETAILED DESCRIPTION OF EXEMPLARY EMBODIMENTS

Exemplary embodiments of the present invention will be described below in detail with reference to the accompanying drawings. Throughout the disclosure, like reference numerals refer to like parts throughout the drawings and embodiments of the present invention.

Figure 1:
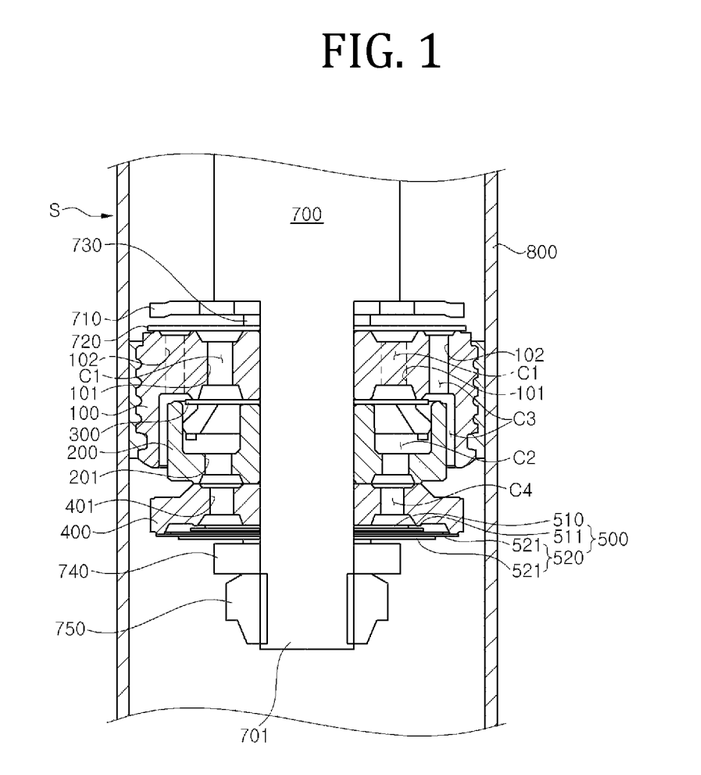
FIG. 1 is a cross-sectional conceptual diagram illustrating an overall configuration of a shock absorber according to an embodiment of the present invention.

FIG. 1 is a cross-sectional conceptual diagram illustrating an overall configuration of a shock absorber according to an embodiment of the present invention.

It can be seen from FIG. 1 that a first piston 100, a pilot valve 300, a second piston 200, a rebound retainer 400, and a disk valve assembly 500 are mounted in a piston rod 700 within a cylinder 800.

The first piston 100 includes a first compression chamber C1 that is connected to an end of the piston rod 700 reciprocating within the cylinder 800 and is formed by a plurality of rebound passages 101 penetrating in a vertical direction. The first piston 100 has an opened lower portion to form an inner space recessed upward.

The pilot valve 300 is connected to the piston rod 700 and disposed in the inner space to selectively open a lower end of the rebound passage 101.

The second piston 200 forms a second compression chamber C2 that is connected to the piston rod 700, has an upper portion accommodated in the inner space, and is disposed under the first piston 100. Connection rebound passages 201 respectively connected to the rebound passages 101 penetrate the second compression chamber C2 in a vertical direction. The second compression chamber C2 has an opened upper portion to communicate with the inner space.

A third compression chamber C3 is formed by a space between an inner peripheral surface of the first piston 100 forming the inner space and an outer peripheral surface of the second piston 200, together with a plurality of compression passages 102 penetrating in a vertical direction of the first piston 100.

A rebound retainer 400 includes a fourth compression chamber C4 that is connected to the piston rod 700, is disposed under the second piston 200, and is formed by extension rebound passages 401 respectively connected to the connection rebound passages 201.

The disk valve assembly 500 is connected to the piston rod 700 and is disposed under the rebound retainer 400. The disk valve assembly 500 opens and closes a passage while allowing a deformation through communication with the extension rebound passages 401.

In addition to the above-described embodiment, the following various embodiments can also be applied to the present invention.

The disk valve assembly 500 includes a disk-S 510 and a main disk 520. The disk-S 510 includes slits 511 communicating with the extension rebound passages 401 along edges, and is tightly disposed in the lower portion of the rebound retainer 400. The main disk 520 is provided with a plurality of unit disks 521 stacked in a lower portion of the disk-S 510.

The shock absorber S further includes a stepped portion 701 that is formed to be stepped in a size smaller than a diameter of the piston rod 700 along the outer peripheral surface of the end of the piston rod 700.

The shock absorber S further includes washers 710 that are connected to the stepped portion 701, are disposed above the first piston 100, and communicate with the compression passages 102 and the rebound passages 101.

In addition, the shock absorber S further includes an intake valve 720 that is connected to the stepped portion 701, is disposed under the washer 710 and above the first piston 100, and opens and closes a passage communicating with the compression passage 102 and the rebound passage 101 while allowing a deformation through communication with the washer 710.

The washer 710, the intake valve 720, the first piston 100, the pilot valve 300, the second piston 200, the rebound retainer 400, and the disk valve assembly 500 are sequentially connected along the vertical direction of the stepped portion 701.

In this case, the end of the stepped portion 701 is sequentially fixed and finished by a finish washer 740 and a finish nut 750.

In addition, the shock absorber S may further include a spacer 730 that is disposed between the washer 710 and the intake valve 720 in the stepped portion 701 and separates the washer 710 and the intake valve 720 from each other while limiting a vertical length where the intake valve 720 is deformed.

Figure 2:
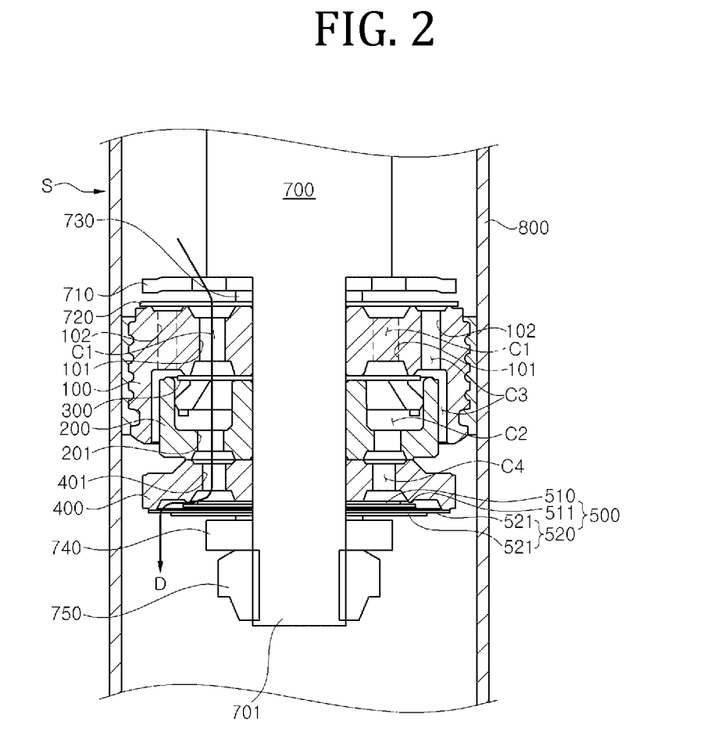
FIG. 2 is a cross-sectional conceptual diagram illustrating a flow of a working fluid in an ultra-low-speed period and a low-speed period during a rebound stroke of a shock absorber according to the embodiment of the present invention.

On the other hand, as illustrated in FIG. 2, the shock absorber S forms a working passage D that mutually connects the first compression chamber C1, the second compression chamber C2, and the extension rebound passage 401 in the ultra-low-speed and low-speed periods during the rebound stroke.

Therefore, the working fluid within the cylinder 800 generates a main damping force while passing through the disk valve assembly 500 via the working passage D.

Figure 3:
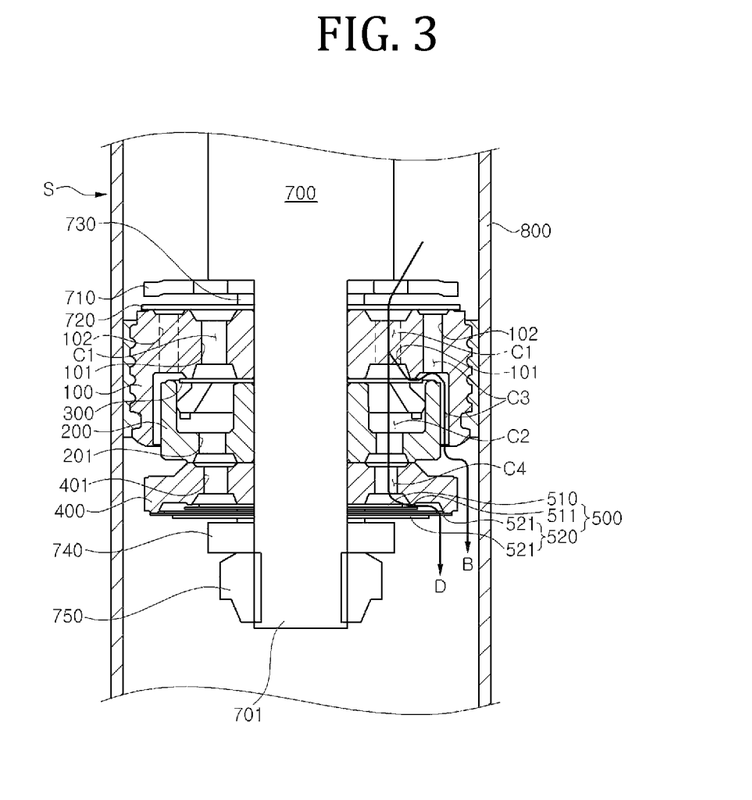
FIG. 3 is a cross-sectional conceptual diagram illustrating a flow of a working fluid in a middle-speed period and a high-speed period during a rebound stroke of a shock absorber according to the embodiment of the present invention.

In addition, as illustrated in FIG. 3, the shock absorber S forms the working passage D of FIG. 2 in the middle-speed and high-speed periods during the rebound stroke. When a pressure of the first compression chamber C1 is higher than a pressure of the second compression chamber C2, the pilot valve 300 is opened to form a bypass passage B that is connected to the third compression chamber C3 and the inside of the cylinder 800.

Therefore, the bypass passage B is connected to a compression passage 102 in the third compression chamber C3 to prevent rapid pressure drop, and achieves a rapid damping force change stepwise and gradually to prevent the pilot valve 300 from being rapidly closed.

Figure 4:
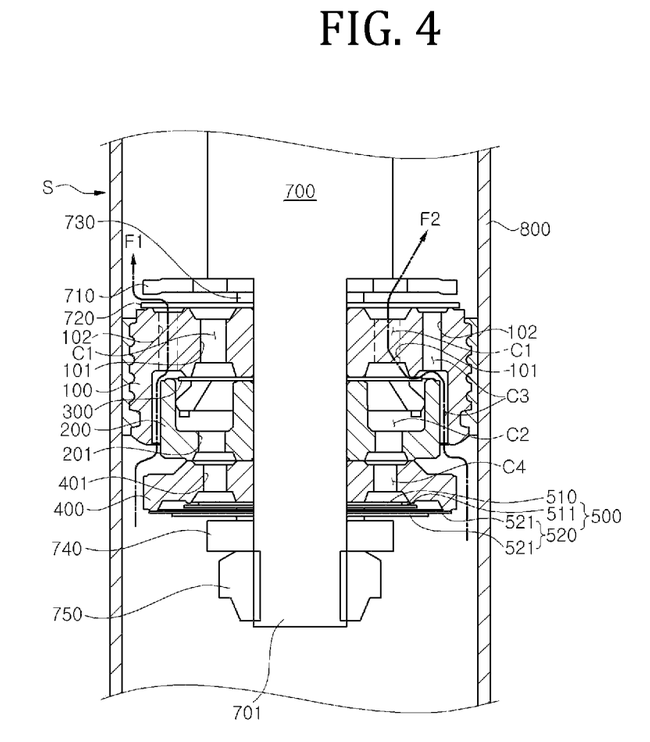
FIG. 4 is a cross-sectional conceptual diagram illustrating a flow of a working fluid during a compression stroke of a shock absorber according to the embodiment of the present invention.

On the other hand, the shock absorber S forms a first compression working passage F1 through which the working fluid flows via the third compression chamber C3 during the compression stroke as illustrated in FIG. 4, and a second compression working passage F2 through the working fluid flows from the lower portion of the third compression chamber C3 via the first compression chamber C1. Therefore, the damping force can be reduced smoothly and constantly over periods from the ultra-low-speed period to the high-speed period.

In addition to the above-described embodiment, embodiments of FIGS. 5 to 8 can also be applied to the present invention.

Figure 5:
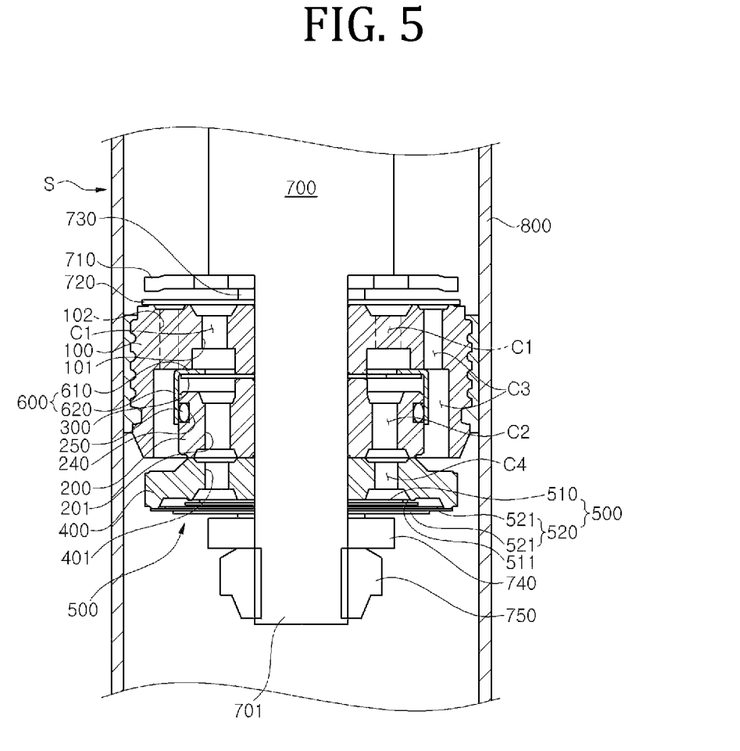
FIG. 5 is a cross-sectional conceptual diagram illustrating an overall configuration of a shock absorber according to another embodiment of the present invention.

FIG. 5 is a cross-sectional conceptual diagram illustrating an overall configuration of a shock absorber according to another embodiment of the present invention.

It can be seen from FIG. 2 that a first piston 100, a pilot valve 300, a pilot valve 300 mounted with a guide member 600, a second piston 200, a rebound retainer 400, and a disk valve assembly 500 are mounted in a piston rod 700 within a cylinder 800.

For reference, in FIG. 5, the same reference numerals as those of the embodiments illustrated in FIGS. 1 to 4 are used to refer to the same elements. Since the structure and operation mechanism thereof are identical, a detailed description thereof will be omitted for convenience.

The guide member 600 is connected along the edge of the pilot valve 300, covers the upper peripheral portion of the second piston 200, and moves upward and downward while interlocking with the pilot valve 300.

The guide member 600 will be described below in more detail. The guide member 600 is provided for preventing a damping force leg phenomenon that an existing pilot valve is not returned to an original position due to a tension of a rubber sealing during a compression stroke. The guide member 600 includes a fixing piece 610 and a cover piece 620.

The fixing piece 610 is a ring-shaped member that is connected along the edge of the pilot valve 300. The cover piece 620 extends from the edge of the fixing piece 610 and faces the upper peripheral portion of the second piston 200.

Therefore, the top surface of the fixing piece 610 opens and closes the lower edge of the rebound passage 101.

At this time, the shock absorber S may further include a ring coupling groove 240 and a ring-shaped sealing member 250. The ring coupling groove 240 is formed to be recessed along the outer peripheral surface of the second piston 200. The ring-shaped sealing member 250 is mounted in the ring coupling groove 240 and faces the guide member 600, that is, the inner surface of the cover piece 620.

The sealing member 250 allows the working fluids within the second and third compression chambers C2 and C3 to maintain a normal flow during the rebound and compression strokes, without being mixed together.

Figure 6:
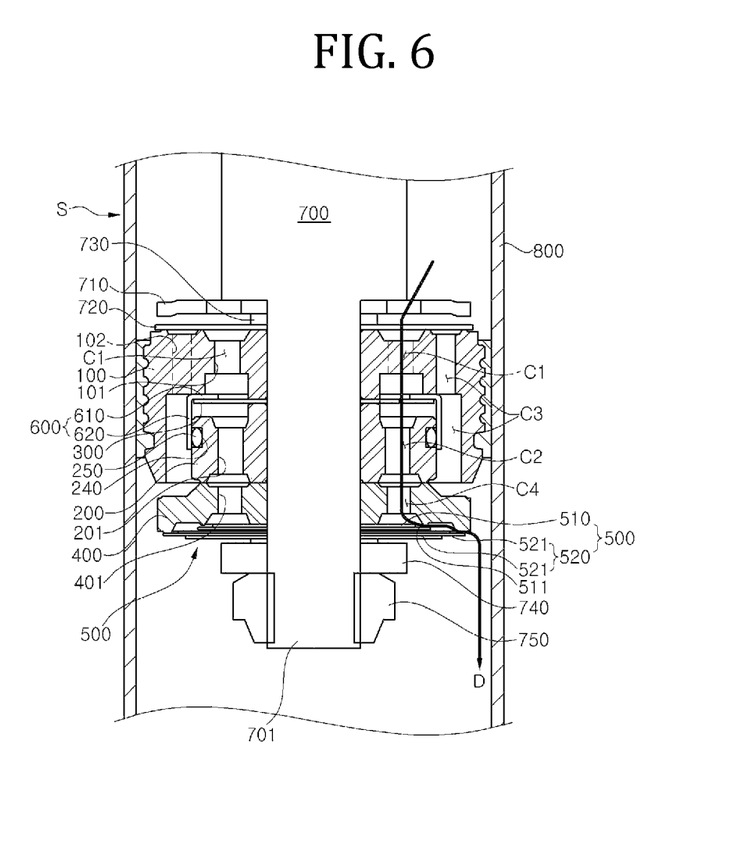
FIG. 6 is a cross-sectional conceptual diagram illustrating a flow of a working fluid in an ultra-low speed period and a low-speed period during a rebound stroke of a shock absorber according to another embodiment of the present invention.

On the other hand, as illustrated in FIG. 6, the shock absorber S forms a working passage D that mutually connects the first compression chamber C1, the second compression chamber C2, and the extension rebound passage 401 in the ultra-low-speed and low-speed periods during the rebound stroke.

Therefore, the working fluid within the cylinder 800 generates a main damping force while passing through the disk valve assembly 500 via the working passage D.

Figure 7:
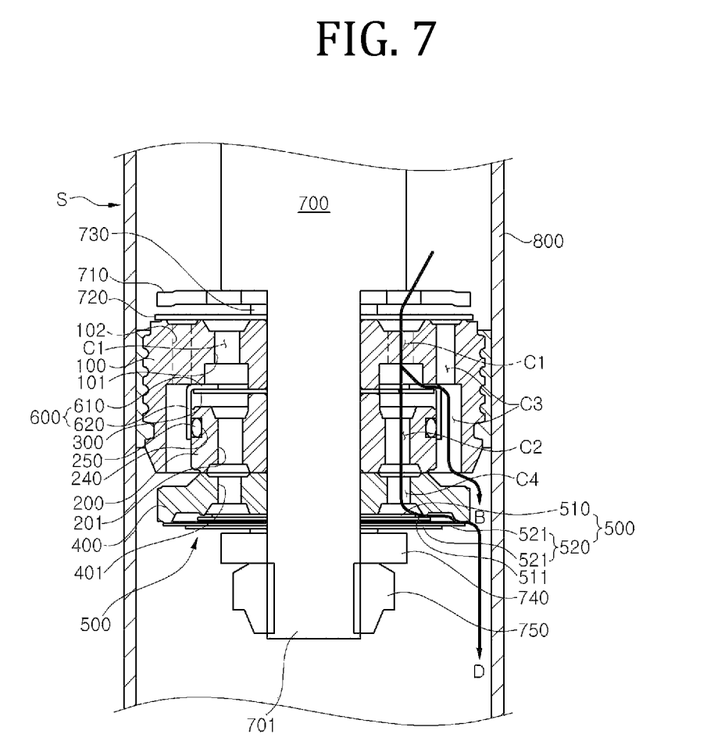
FIG. 7 is a cross-sectional conceptual diagram illustrating a flow of a working fluid in a middle-speed period and a high-speed period during a rebound stroke of a shock absorber according to the embodiment of the present invention.

In addition, as illustrated in FIG. 7, the shock absorber S forms the working passage D of FIG. 2 in the middle-speed and high-speed periods during the rebound stroke. When a pressure of the first compression chamber C1 is higher than a pressure of the second compression chamber C2, the pilot valve 300 is opened to form a bypass passage B that is connected to the third compression chamber C3 and the inside of the cylinder 800, while the guide member 600 moves downward.

Therefore, the bypass passage B is connected to a compression passage 102 in the third compression chamber C3 to prevent rapid pressure drop, and achieves a rapid damping force change stepwise and gradually to prevent the pilot valve 300 from being rapidly closed.

Figure 8:
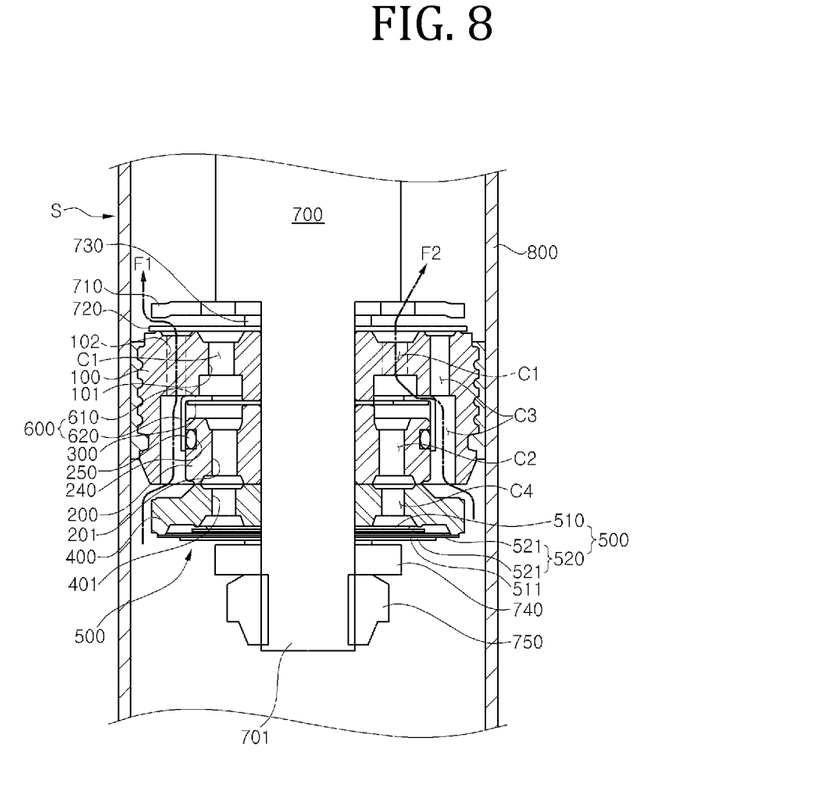
FIG. 8 is a cross-sectional conceptual diagram illustrating a flow of a working fluid during a compression stroke of a shock absorber according to the embodiment of the present invention.

On the other hand, the shock absorber S forms a first compression working passage F1 through which the working fluid flows via the third compression chamber C3 during the compression stroke as illustrated in FIG. 8, and a second compression working passage F2 through the working fluid flows from the lower portion of the third compression chamber C3 via the first compression chamber C1. Therefore, the damping force can be reduced smoothly and constantly over periods from the ultra-low-speed period to the high-speed period.

That is, in order to solve the phenomenon that the pilot valve is not closed toward the first piston 100 due to the tension of the rubber sealing provided in the existing pilot valve for tightness during the compression stroke, the shock absorber S lifts the guide member 600 toward the first piston 100 by using a pressure resulting from the flow of the working fluid, thereby enhancing the following characteristic of the pilot valve 300 and preventing the damping force leg phenomenon during the compression stroke.

As described above, the shock absorber according to the present invention can improve the ride comfort by reducing the damping force over periods from the ultra-low-speed period to the high-speed period, and can achieve the compact configuration and the cost reduction by reducing the overall length of processing portions.

According to the present invention, the first compression chamber is formed by the first piston, and the second compression chamber is formed by the second piston with a built-in pilot valve. The third compression chamber is formed between the first piston and the second piston. The fourth compression chamber is formed by the rebound retainer. Therefore, the working fluid selectively flows through the first, second, third and fourth compression chambers, thereby improving the ride comfort through a smooth and constant reduction of the damping force over periods from the ultra-low-speed period to the high-speed period.

According to the present invention, the first compression chamber is formed by the first piston, and the second compression chamber is formed by the second piston a built-in pilot valve and guide member. The third compression chamber is formed between the first piston and the second piston. The fourth compression chamber is formed by the rebound retainer. Therefore, the working fluid selectively flows through the first, second, third and fourth compression chambers, thereby improving the ride comfort through a smooth and constant reduction of the damping force over periods from the ultra-low-speed period to the high-speed period.

According to the present invention, the third compression chamber is formed between the second piston and the first piston stacked such that the upper portions thereof are built-in, achieving the compact configuration and the cost reduction by reducing the overall length of processing portions.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

100: first piston rod
101: rebound passage
102: compression passage
200: second piston rod
201: connection rebound passage
300: pilot valve
400: rebound retainer
401: extension rebound passage
500: disk valve assembly
510: disk-S
511: slit
520: main disk
521: unit disk
600: guide member
610: fixing piece
620: cover piece
700: piston rod
701: stepped portion
710: washer
720: intake valve
730: spacer
740: finish washer
750: finish nut
800: cylinder
B: bypass passage
C1: first compression chamber
C2: second compression chamber
C3: third compression chamber
C4: fourth compression chamber
D: working passage
F1: first compression working passage
F2: second compression working passage

What is claimed is:

1. A shock absorber comprising:
a first piston including a first compression chamber that is connected to an end of the piston rod reciprocating within a cylinder and is formed by a plurality of rebound passages penetrating in a vertical direction, the first piston having an opened lower portion to form an inner space recessed upward;
a pilot valve connected to the piston rod and disposed in the inner space to selectively open a lower end of the rebound passage;
a second piston forming a second compression chamber that is connected to the piston rod, has an upper portion accommodated in the inner space, and is disposed under the first piston, wherein connection rebound passages respectively connected to the rebound passages penetrate the second compression chamber in a vertical direction, and the second compression chamber has an opened upper portion to communicate with the inner space;
a rebound retainer including a fourth compression chamber that is connected to the piston rod, is disposed under the second piston, and is formed by extension rebound passages respectively connected to the connection rebound passages;
a disk valve assembly connected to the piston rod, disposed under the rebound retainer, and opening and closing a passage while allowing a deformation through communication with the extension rebound passages; and
a third compression chamber formed by a space between an inner peripheral surface of the first piston forming the inner space and an outer peripheral surface of the second piston, together with a plurality of compression passages penetrating in a vertical direction of the first piston.

2. The shock absorber according to claim 1, further comprising a guide member connected along an edge of the pilot valve to cover an upper peripheral portion of the second piston and move upward and downward while interlocking with the pilot valve.

3. The shock absorber according to claim 2, wherein the guide member comprises:
a ring-shaped fixing piece connected along the edge of the pilot valve; and
a cover piece extending from an edge of the fixing piece and facing an upper peripheral surface of the second piston,
wherein a top surface of the fixing piece opens and closes a lower edge of the rebound passage.

4. The shock absorber according to claim 2, further comprising:
   a ring coupling groove recessed along the outer peripheral surface of the second piston; and
   a ring-shaped sealing member mounted in the ring coupling groove and facing an inner surface of the guide member.

5. The shock absorber according to claim 1, wherein the shock absorber forms a working passage that mutually connects the first compression chamber, the second compression chamber, and the extension rebound passage in ultra-low-speed and low-speed periods, and
   a working fluid within the cylinder generates a damping force while passing through the disk valve assembly via the working passage.

6. The shock absorber according to claim 1, wherein the disk valve assembly comprises:
   a disk-S including slits communicating with the extension rebound passages along edges and tightly disposed in a lower portion of the rebound retainer; and
   a main disk provided with a plurality of unit disks stacked in a lower portion of the disk-S,
   the shock absorber forms a working passage that mutually connects the first compression chamber, the second compression chamber, and the extension rebound passage in middle-speed and high-speed periods, and
   when a pressure of the first compression chamber is higher than a pressure of the second compression chamber, the pilot valve is opened to form a bypass passage that is connected to the third compression chamber and the inside of the cylinder.

7. The shock absorber according to claim 1, further comprising:
   a stepped portion formed to be stepped in a size smaller than a diameter of the piston rod along an outer peripheral surface of the end of the piston rod;
   a washer connected to the stepped portion, disposed above the first piston, and communicating with the compression passages and the rebound passages; and
   an intake valve connected to the stepped portion, disposed under the washer and above the first piston, and opening and closing a passage communicating with the compression passage and the rebound passage while allowing a deformation through communication with the washer,
   wherein the first piston, the pilot valve, the second piston, the rebound retainer, and the disk valve assembly are sequentially connected along a vertical direction of the stepped portion.

8. The shock absorber according to claim 1, further comprising:
   a washer connected to an end of the piston rod, disposed above the first piston, and communicating with the compression passages and the rebound passages;
   an intake valve connected to the piston rod, disposed under the washer and above the first piston, and opening and closing a passage communicating with the compression passage and the rebound passage while allowing a deformation through communication with the washer; and
   a spacer connected to the piston rod, disposed between the washer and the intake valve, and separating the washer and the intake valve from each other while limiting a vertical length where the intake valve is deformed.

* * * * *